(12) United States Patent
Horvath et al.

(10) Patent No.: US 7,193,179 B2
(45) Date of Patent: *Mar. 20, 2007

(54) CHANNELED UNDER FLOOR HEATING ELEMENT

(75) Inventors: Joshua D. Horvath, Moore, SC (US);
Andrew D. Child, Moore, SC (US);
Karen M. Green, Simpsonville, SC (US); Shawn Davis, Inman, SC (US);
Keith M. Blackwell, Duncan, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/328,859

(22) Filed: Jan. 10, 2006

(65) Prior Publication Data

US 2006/0151475 A1    Jul. 13, 2006

Related U.S. Application Data

(63) Continuation-in-part of application No. 11/131,626, filed on May 18, 2005, now Pat. No. 7,038,170.

(60) Provisional application No. 60/643,354, filed on Jan. 12, 2005.

(51) Int. Cl.
*H05B 11/00* (2006.01)

(52) U.S. Cl. ............. 219/212; 219/211; 219/545; 219/528; 219/529; 219/516

(58) Field of Classification Search ......... 219/212–213, 219/505–529, 543–545, 549, 211, 516; 392/435–437
See application file for complete search history.

(56) References Cited

U.S. PATENT DOCUMENTS

| 4,031,352 A | 6/1977 | Oosterberg | 219/212 |
|---|---|---|---|
| 4,058,704 A | 11/1977 | Shimizu | 219/528 |
| 4,061,827 A | 12/1977 | Gould | 428/368 |
| 4,063,069 A | 12/1977 | Peeri | 219/545 |
| 4,198,562 A | 4/1980 | Mills et al. | 219/505 |
| 4,485,296 A | 11/1984 | Ueda et al. | 219/505 |
| 4,577,094 A | 3/1986 | Mills | 219/505 |
| 4,598,195 A | 7/1986 | Matsuo | 219/497 |
| 4,607,154 A | 8/1986 | Mills | 219/505 |
| 4,620,085 A | 10/1986 | Horikawa et al. | 219/528 |
| 4,633,062 A | 12/1986 | Nishida et al. | 219/212 |
| 4,656,334 A | 4/1987 | Endo et al. | 219/212 |
| 4,677,281 A | 6/1987 | Mills | 219/505 |
| 4,855,572 A | 8/1989 | Wallgren et al. | 219/444.1 |
| 4,990,744 A | 2/1991 | Willner | 219/213 |
| 5,422,462 A | 6/1995 | Kishimoto | 219/545 |
| 5,484,983 A | 1/1996 | Roell | 219/545 |
| 5,581,192 A | 12/1996 | Shea et al. | 324/722 |
| 5,776,609 A | 7/1998 | McCullough | 428/375 |
| 5,804,291 A | 9/1998 | Fraser, Jr. | 428/283 |
| 5,824,996 A | 10/1998 | Kochman et al. | 219/529 |

(Continued)

*Primary Examiner*—Robin Evans
*Assistant Examiner*—Vinod Patel
(74) *Attorney, Agent, or Firm*—Terry T. Moyer; Cherly J. Brickey

(57) ABSTRACT

A channeled under floor heating element incorporating channeled areas for accepting heat and sensor wires. The inventive channeled under floor heating element includes an arrangement of seam structures defining channels housing substantially discrete elongate heating and sensing elements arranged in a substantially similar pattern.

20 Claims, 5 Drawing Sheets

U.S. PATENT DOCUMENTS

| | | | |
|---|---|---|---|
| 5,837,164 A | 11/1998 | Zhao | 252/500 |
| 5,861,610 A | 1/1999 | Weiss | 219/497 |
| 5,902,518 A | 5/1999 | Khazai et al. | 252/511 |
| 5,908,573 A | 6/1999 | Chiles et al. | 219/545 |
| 5,916,506 A | 6/1999 | Breznak et al. | 264/104 |
| 5,952,099 A | 9/1999 | Asher et al. | 428/370 |
| 5,968,854 A | 10/1999 | Akopian et al. | 442/132 |
| 5,972,499 A | 10/1999 | Rodriguez et al. | 428/368 |
| 6,080,690 A | 6/2000 | Lebby et al. | 442/209 |
| 6,090,313 A | 7/2000 | Zhao | 252/500 |
| 6,093,908 A | 7/2000 | Haag | 219/204 |
| 6,160,246 A | 12/2000 | Rock et al. | 219/545 |
| 6,163,907 A | 12/2000 | Larson | 5/691 |
| 6,172,344 B1 | 1/2001 | Gordon et al. | 219/529 |
| 6,174,825 B1 | 1/2001 | Dutt | 442/43 |
| 6,215,111 B1 | 4/2001 | Rock et al. | 219/545 |
| 6,229,123 B1 | 5/2001 | Kochman et al. | 219/549 |
| 6,242,094 B1 | 6/2001 | Breznak et al. | 428/373 |
| 6,278,085 B1 | 8/2001 | Abukasm | 219/213 |
| 6,288,372 B1 | 9/2001 | Sandberg et al. | 219/544 |
| 6,294,768 B1 | 9/2001 | Liebich | 219/528 |
| 6,303,905 B1 | 10/2001 | Chiles et al. | 219/213 |
| 6,310,332 B1 | 10/2001 | Gerrard | 219/505 |
| 6,381,482 B1 | 4/2002 | Jayaraman et al. | 600/388 |
| 6,497,951 B1 | 12/2002 | DeAngelis et al. | 428/364 |
| 6,552,310 B1 | 4/2003 | Hulldin et al. | 219/528 |
| 6,582,456 B1 | 6/2003 | Hand et al. | 607/108 |
| 6,680,117 B2 | 1/2004 | DeAngelis et al. | 428/372 |
| 6,713,724 B1 | 3/2004 | Carr et al. | 219/212 |
| 6,713,733 B2 | 3/2004 | Kochman et al. | 219/549 |
| 6,756,572 B2 | 6/2004 | Lee | 219/505 |
| 6,768,086 B2 | 7/2004 | Sullivan et al. | 219/494 |
| 6,770,854 B1 | 8/2004 | Keane | 219/529 |
| 6,855,915 B2 | 2/2005 | Gehring | 219/213 |
| 6,914,216 B1 | 7/2005 | Chen | 219/212 |
| 6,943,320 B1 | 9/2005 | Bavett | 219/213 |
| 2001/0025846 A1 | 10/2001 | Kochman et al. | 219/545 |
| 2002/0137831 A1 | 9/2002 | Horibe et al. | 524/439 |
| 2003/0015285 A1 | 1/2003 | Iwamoto et al. | 156/325 |
| 2004/0035853 A1* | 2/2004 | Pais | 219/548 |

* cited by examiner

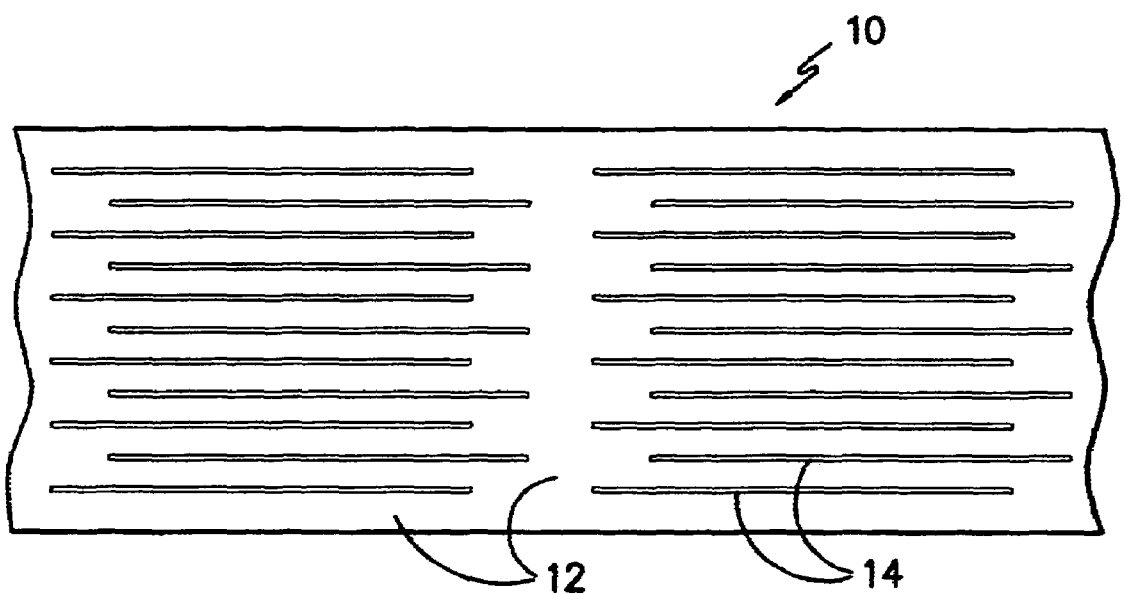
FIG. -1-
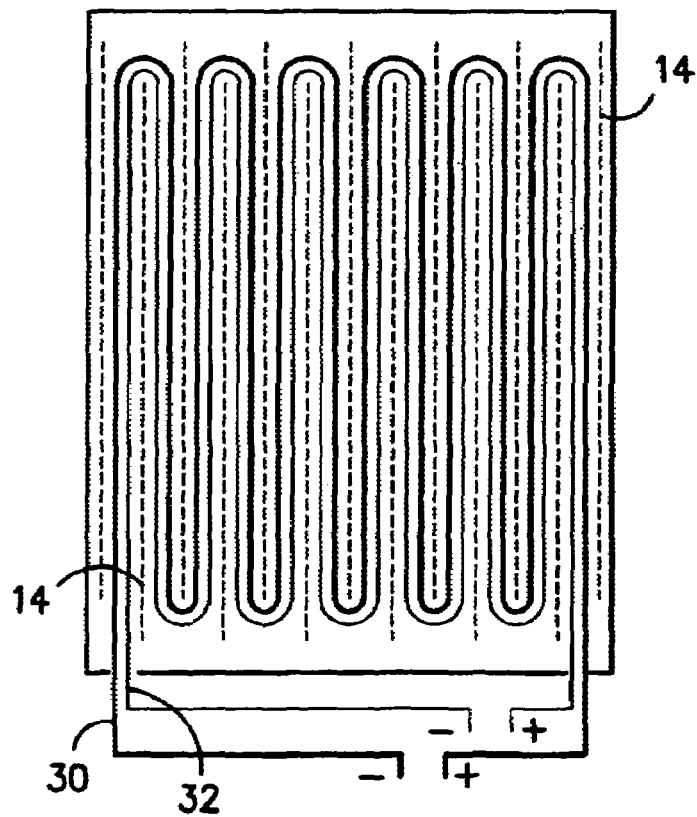
FIG. -2-

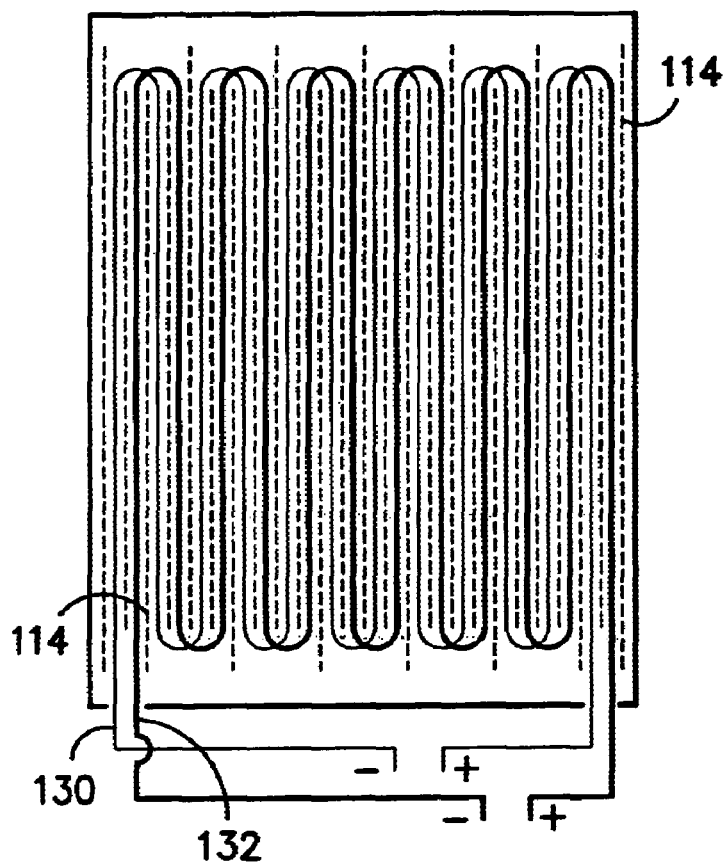
FIG. -3-
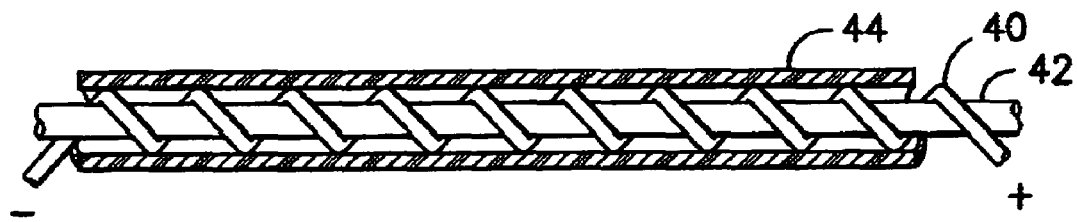
FIG. -4-
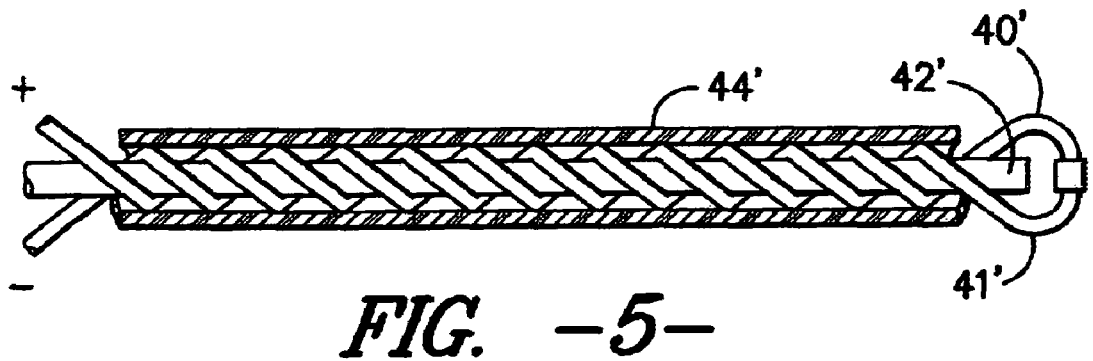
FIG. -5-

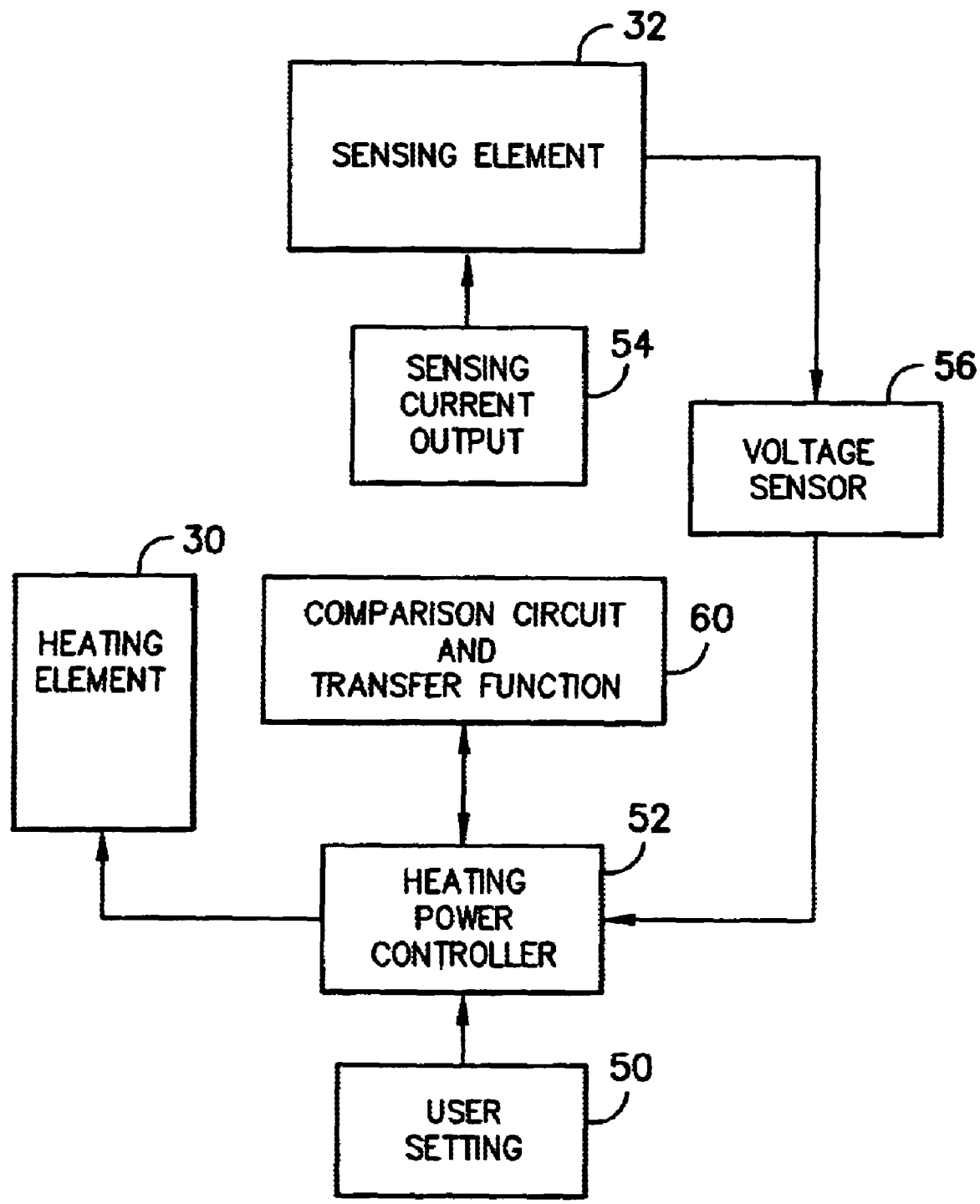
FIG. —6—

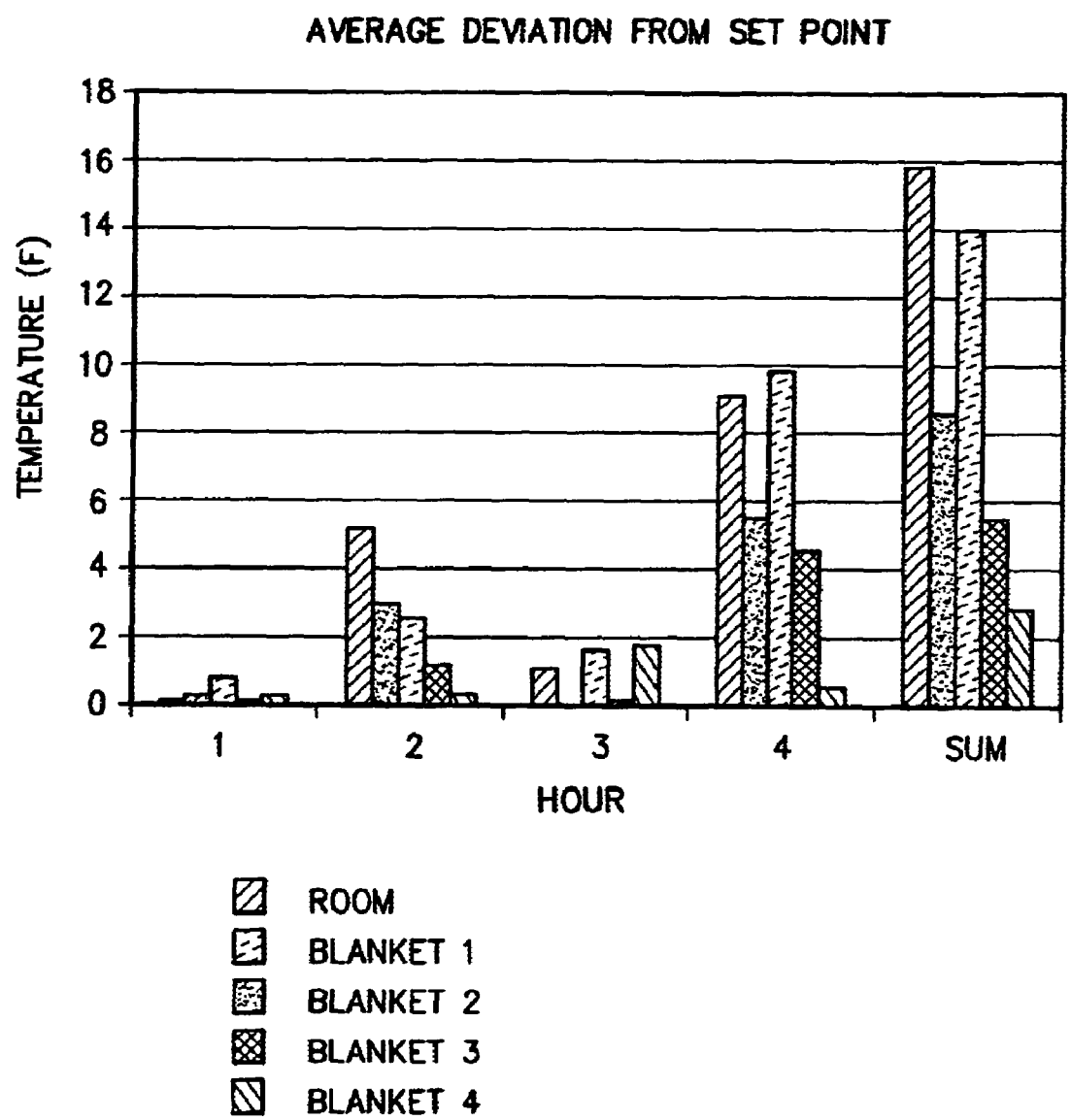
FIG. -7-

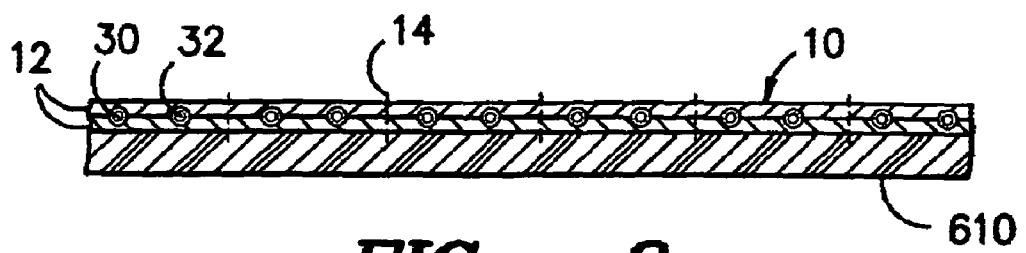
*FIG. —8—*
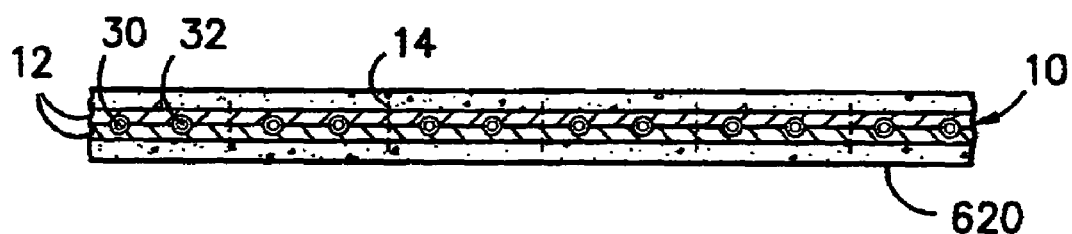
*FIG. —9—*
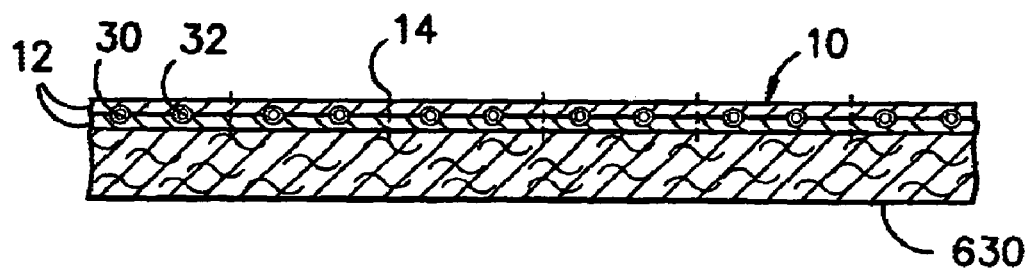
*FIG. —10—*
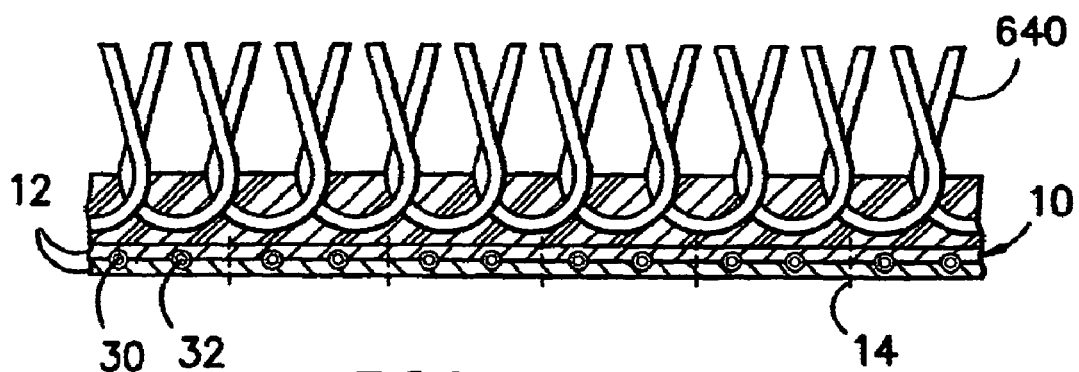
*FIG. —11—*

CHANNELED UNDER FLOOR HEATING ELEMENT

CROSS-REFERENCE TO RELATED APPLICATIONS

This application claims the benefit of and priority from U.S. Provisional Application No. 60/643,354, filed on Jan. 12, 2005 and Co-pending application Ser. No. 11/257,340 filed Oct. 24, 2005 which is a continuation in part of application Ser. No. 11/131,626, filed May 18, 2005, now U.S. Pat. No. 7,038,170, the contents of which are hereby incorporated by reference in their entirety as if fully set forth herein.

TECHNICAL FIELD

This invention relates generally to under floor heating elements. More particularly, the invention relates to under floor heating elements including channeled areas for accepting elongate heating and sensor elements. The heating and sensor elements are discrete from one another such that the sensor elements measure the bulk flooring temperature for regulated feedback control of the heating elements. Methods for forming the under floor heating element and arranging the heating and sensor elements are also provided.

BACKGROUND

Many systems for providing under floor heating are known. One method, hydronic floor heating systems, has become popular. However, a hydronic system requires tubing which is typically installed in a concrete floor slab and connected to a pump and boiler system. Although a comfortable radiant heating effect is usually provided, these installation complexities generally restrict the use of hydronic systems to new construction and relatively large areas that are to be heated. They are usually not well suited for remodeling applications.

Radiant floor heating has long been used for the heating of floors and/or occupied space above the floor. This type of heating system has advantages over other heating systems in several respects, most notably in the comfort level of the occupants. The heat from the floor naturally rises to provide relatively uniform and draft free warmth. However, there are disadvantages as the hot air ducts that extend beneath the floor in order to warm it are subject to complexity and high construction costs and also require space for the ductwork.

Electrically resistive heating systems having a meshwork structure which holds heating elements have been proposed for various heating applications. However, the systems that have been proposed in the past have not been suitable for floor heating applications for a variety of practical reasons. For the most part, they have been too thick to allow their use beneath floor covering materials. Also, connecting the electric heating elements to a source of power has presented significant problems both practically and aesthetically. Securely attaching the heating elements has been an additional problem. The tendency for the elements to generate significant electromagnetic fields has been another cause for concern. Additionally, current resistive heating systems have set sizes due to electrical wire configurations and have limited temperature sensing and regulation systems. All patent documents referenced in this specification are hereby specifically incorporated by reference in their entirety as if fully set forth herein.

SUMMARY

The present invention provides advantages and/or alternatives over the prior art by providing under floor heating elements incorporating substantially discrete elongate heating and sensing elements arranged in a substantially similar pattern within the heating element.

According to one contemplated practice the heating elements and sensing elements each incorporate one or more conductive metallic wires such as copper wire, copper alloy wire or the like in wrapped relation around a core of polymeric fiber or the like with an insulating jacket surrounding the core and wrapped wire. The discrete elongate heating elements and sensing elements are threaded through common channels at the interior of the heating element in a common pattern such that the heating elements and sensing elements run in substantially parallel relation to one another.

According to another contemplated practice the heating elements and sensing elements each incorporate one or more conductive metallic wires such as insulated copper wire or the like in wrapped relation around a core of polymeric fiber or the like with an insulating jacket surrounding the core and wrapped wire. The discrete elongate heating elements and sensing elements are threaded through parallel channels at the interior of the heating element in a pattern such that channel walls separate the heating elements and sensing elements over at least a portion of the pattern.

BRIEF DESCRIPTION OF THE DRAWINGS

The present invention will now be described by way of example only, with reference to the accompanying drawings which constitute a part of the specification herein and in which:

FIG. 1 is an overhead view of an exemplary channeled under floor heating element composite showing a channel pattern;

FIG. 2 is an exemplary pattern for threading heating and sensing elements through common channels within a channeled under floor heating element;

FIG. 3 is an exemplary pattern for threading heating and sensing elements through discrete channels within a channeled under floor heating element;

FIG. 4 is a cut-away view of a wrapped wire construction for use as a heating or sensing element utilizing a single wire wrapped around a fiber core;

FIG. 5 is a cut-away view of a wrapped wire construction for use as a heating or sensing element utilizing two wires wrapped around a fiber core;

FIG. 6 is a diagram representing operation of the channeled under floor heating element; and, FIG. 7 is a bar chart illustrating comparative performance of warming blanket constructions in holding a steady temperature during variations of room temperature.

FIG. 8 is a cut-away view of a channeled under floor heating element and a non-skid layer.

FIG. 9 is a cut-away view of a channeled under floor heating element encased in foam.

FIG. 10 is a cut-away view of a channeled under floor heating element attached to a carpet gad.

FIG. 11 is a cut-away view of a channeled under floor heating element attached to a carpet substrate.

DETAILED DESCRIPTION

Exemplary embodiments of the invention will now by described by reference to the drawings wherein like elements are designated by corresponding reference number throughout the various views. All referenced patent documents are hereby incorporated by reference as if fully set forth herein. Referring now to the figures, in FIG. 1, an under floor heating element 10 (shell structure) is shown incorporating a pattern of channels 12 defined between elongate seam structures 14. The elongate seam structures 14 preferably connect together the shell fabric layers within the heating element 10 so as to define a pattern of barrier walls between the channels 12. The seam structures 14 may be of any suitable construction including woven seams, sewn seams, adhesive seams, welded seams, ultrasonically welded seams and the like. Adhesives such as curable urethane or the like may potentially be preferred.

It is contemplated that the shell fabrics are preferably warp knit, circular knit, nap knit micro-denier, woven, non-woven or needle punch construction formed from suitable fibrous materials including polyester, polypropylene or the like. Preferably, the conductive wires in the heating element substantially cover the enter surface of heating element so as to evenly heat the floor. Lightweight non-woven or woven fabrics would be most preferred to keep the thickness of the heating system to a minimum.

A fire retardant layer may be incorporated into the under floor heating element in one or both of the shell fabrics. Fire retardant chemistries are well known and may be used as the flame retardant layer in the invention. A preferred fire barrier material is an aramid fiber which is made by E.I. DuPont de Nemours & Co. and sold as KEVLAR. Other known fire barrier materials which are known are preoxidized acrylic and fiberglass.

Regardless of the formation technique or layer pattern utilized, the resulting heating element 10 (a shell structure) is preferably characterized by a predefined pattern of channels through which elongate heating and sensor elements may be threaded. A first exemplary arrangement of channels containing a patterned arrangement of elongate heating and sensor elements is illustrated in FIG. 2. As shown, in this construction the seam structures 14 run in parallel relation to one another in the length direction of the under floor heating element. The seam structures 14 define boundaries for interior channels through which a discrete elongate heating element 30 and a discrete elongate sensing element 32 are threaded in a desired pattern such as the illustrated arrangement. Preferably, the seams run at least partially along the length of the heating element, more preferably the seams run almost the full length of the heating element. In the illustrated construction the elongate heating element 30 and the elongate sensing element 32 follow a common pattern thereby remaining substantially parallel to one another while extending through common channels. If desired, the elongate heating element 30 and the elongate sensing element 32 may cross at localized points such as where they reverse direction at the top and bottom of the pattern while nonetheless maintaining a common pattern.

The heating and sensing elements described above can be in the form of a mat that is positioned under flooring systems such as laminate flooring, hardwood flooring, vinyl flooring, or tile flooring. Alternatively, the scrim can be embedded in a foam layer used as a carpet pad or incorporated into the carpet composite.

A second exemplary arrangement of channels containing a patterned arrangement of elongate heating and sensor elements is illustrated in FIG. 3 wherein elements corresponding to those previously described are designated by like reference numerals increased by 100. As shown, in this construction a higher concentration of seam structures 114 is utilized with the elongate heating element 130 and the elongate sensing element 132 running through separate channels separated by the seam structures 114. Thus, while the elongate heating element 130 and the elongate sensing element 132 utilize the same pattern running from end to end of the heating element, there is a slight phase shift between the two patterns. Physical separation between the elongate heating element 130 and the elongate sensing element 132 is maintained by the seam structures 114. Thus, as with the embodiment of FIG. 2, the elongate heating element 130 and the elongate sensing element 132 are disposed in substantially parallel relation to one another with the channels. As shown, the elongate heating element 130 and the elongate sensing element 132 may cross at localized points such as where they reverse direction at the top and bottom of the pattern while nonetheless maintaining the desired common pattern. The common pattern may be, as non-limiting examples, an in phase or out of phase sinusoidal pattern, an in phase or out of phase wave pattern.

Although they perform different functions, the elongate heating element and the elongate sensing element may be of substantially similar construction. By way of example only, and not limitation, constructions for such elongate elements are illustrated in FIGS. 4 and 5. In the construction illustrated in FIG. 4, a single conductive metallic wire 40 such as copper or the like extends in wrapped relation around a flexible core 42 such as a polymeric fiber or the like. The metallic wire 40 may be formed of any suitable material including copper, copper alloys, and other ferrous and nonferrous metals including nickel, steel, and the like. According to one contemplated practice, the metallic wire 40 may be copper alloy wire such as is available from Fisk Alloy having a thickness of about 33 to about 42 American wire gauge (awg). The metallic wire 40 may be wrapped around a PET textile core having a linear density of about 500 to about 1000 denier. An insulating layer 44 such as PVC or the like extends in surrounding relation to the wrapped structure. It has been found that elongate structures of such construction exhibit substantial flexibility without undue levels of strain hardening so as to permit their insertion in a desired pattern without undue strain hardening and embrittlement. If desired, the metallic wire 40 may also include a nonconductive coating such as enamel or the like. However, metallic wires without such coating may also be utilized if desired.

In the construction illustrated in FIG. 5, a pair of conductive metallic wires 40', 41' such as previously described extends in wrapped relation around a flexible core 42' such as a polymeric fiber or the like. In all other respects the structure is substantially identical to that of FIG. 4. Such structures exhibit substantial flexibility with sufficient structural stability to be threaded through channels within the heating element. A potential benefit is that the two wires may be connected together at one end of the structure as shown thereby completing a circuit so that only one end of the elongate structure needs to be available to the heating or sensing circuit.

As illustrated in FIG. 6, according to one contemplated practice, a user will connect the system to a power source and select a desired user setting 50 such as a dial setting of 1 to 10 or specific desired temperature to activate the system. A signal is sent from the user setting 50 to a heating power controller 52 for delivery of current to the heating element 30, 130. In conjunction with activation of the system, a sensing current output 54 is delivered to the elongate sensing element 32, 132. During application of the sensing current a voltage sensor measures the voltage across the sensing element and transmits that data to the heating power controller. Based on the known sensing current output and the measured voltage across the sensing element, the heating power controller calculates the temperature of the sensing element based on a comparison circuit and transfer function 60 and/or a look-up table programmed into the controller. Based on the measured temperature of the sensing element, the heating power controller then adjusts and regulates the current flow to the heating element as necessary to achieve the selected user setting. This process is performed continuously to achieve and maintain a desired steady state temperature.

As previously indicated, in the present invention the elongate heating element 30, 130 and elongate sensing element 32, 132 are substantially discrete from one another rather than being contained within a common elongate structure. However, they are nonetheless arranged in a common pattern in substantially parallel relation to one another within the heating element. The use of such discrete heating and sensing elements arranged in common patterns with one another has been shown to provide a dramatically improved ability to maintain a steady state temperature within the under floor heating element as the room temperature changes.

In one embodiment, multiple channeled under floor heating elements are electrically connected in a continuous circuit. This allows for the central heating and temperature control of very large areas or multiple areas. Preferably, the channeled under floor heating element also has at least one insulating layer. This layer serves to insulate the heating element electrically and or physically. The heating element is arranged in a switchback pattern that minimizes the electromagnetic field generated when the element is energized. The heating element arrangement includes side by side inward and outward runs and the fields in the two side by side runs essentially cancel each other.

Preferably, the channeled under floor heating element 10 has a non-skid layer 610 as shown, for example in FIG. 8. This non-skid layer helps keep the heating element from moving under the flooring and is preferably a tackified foam or high friction foam layer. This soft and deformable foam material, for example but not by way of limitation, is foam rubber or tackified foam rubber, polyurethane foam, rubber, or tackified polyurethane foam. The tackified foam may be tackified by a chemical activating agent or by radiation heating. Moisture may serve as a chemical activating agent. Radiation heating of the foam may make the foam layer tacky for example, by gamma rays, ultra-violet rays or an electron beam.

In one embodiment, the channeled under floor heating element 10 is encased in foam 620 as shown in FIG. 9. In another embodiment, the under floor heating element 10 is attached to a carpet pad 630 as shown in FIG. 10. The encasing foam and carpet pad may be virgin foam or re-bond carpet pads. Some examples of constructions for the under floor heating element to be encased in foam include laminating layers of foam around the heating element and coating foamable material on the heating element and the foaming the material. FIG. 11 shows a cut-away view of the channeled under floor heating element 10 attached to a caret substrate 640.

Attaching the carpet pad to the under floor heating element may be done by any known means, for example but not limited to, an pressure sensitive adhesive, a UV curable adhesive, flame lamination, and a physical means such as staples. The foam or carpet pad layer preferably has a density of between about 12 pounds per cubic foot and about 20 pounds per cubit foot and more preferably between about 14 pounds per cubic foot and about 16 pounds per cubic foot.

It is a particular feature of the invention that the under floor heating element is well suited for renovation and remodeling applications as well as new construction. There is no need for piping, ductwork or other complicated mechanical installations that are ill suited for use in remodeling. Instead, the heating mat of the present invention can simply be laid out on the sub-floor, and the finished flooring can be installed in the usual way. The presence of mesh openings in the heating element and the scrim is important for at least one installation embodiment, where it accommodates mortar used for ceramic tile laying and adhesives used to hold down wood flooring. The yarn strands in the heating element actually add reinforcement and tensile strength to tile floors due to the reinforcing effect that results when the strands are embedded in the mortar used to lay the tile. The under floor heating element may be used under many flooring options, including but not limited to, wall to wall carpet, area rugs, carpet tiles, ceramic or stone tiles, wood flooring, laminate, and linoleum flooring.

The heating element is preferably thin enough that it can be installed in one room without noticeably changing the floor level at the doorway to an adjacent room. The heating element can also be installed in only a part of one room without creating a noticeable change in the floor level. Installation is simple and requires only an electrical connection to the building power source which can be easily established by an electrician after the heating element has been completely installed beneath the floor covering.

In order to demonstrate the benefits of the present channeled under floor heating element invention, temperature data was collected on warming blankets with different wiring arrangements within a temperature controlled room. It is believed that the results using the specific channeled wire configurations in blankets show the same trend as if the wire configurations were used in under floor heating. The test blankets were identical to one another in all respects except for the wiring. The test blankets were set at an initial setting and left at that setting throughout the test. The room temperature was cycled from an initial set point of 75 degrees Fahrenheit. The first hour was at 75 degrees Fahrenheit, the next hour the room temperature was reduced to 65 degrees Fahrenheit, then increased back to 75 degrees Fahrenheit, and finally increased to 85 degrees Fahrenheit. Blanket temperature was measured throughout the test to see how well the blanket sensed the room temperature and then responded. The test samples were: (1) a commercial warming blanket having a heating and sensor wire arranged in a common sleeve running in a sinusoidal pattern, (2) a warming blanket that is believed to be formed according to the teachings in U.S. Pat. No. 6,686,561, (3) a warming blanket incorporating separate discrete elongate heating and sensing elements arranged through common interior channels in a pattern as shown in FIG. 2, an under floor heating element incorporating separate discrete elongate heating and sensing elements arranged through separate interior channels in a pattern as shown in FIG. 3.

Performance was evaluated based on the deviation of the blanket temperature from the initial set point of 75 degrees Fahrenheit. A perfect blanket would have the same temperature regardless of what the room temperature was resulting in a value of zero deviation. A blanket with poor temperature control would substantially follow room temperature and have approximately the same value of deviation as the room. FIG. 7 is a bar chart showing the average deviation values for the room and for each blanket relative to the initial 75 degree Fahrenheit at the different time points, and a final summation of the deviations. The summation of the deviations is believed to be the clearest identifier of the blanket performance. As demonstrated, blankets 3 and 4 provided superior performance in maintaining a steady temperature when subjected to changes in room temperature with blanket 4 providing the best results of any blanket tested. These learnings are believed to be applicable to under floor heating systems.

While the present invention has been illustrated and described in relation to certain potentially preferred embodiments and practices, it is to be understood that the illustrated and described embodiments and practices are illustrative only and that the present invention is in no event to be limited thereto. Rather, it is fully contemplated that modifications and variations to the present invention will no doubt occur to those of skill in the art upon reading the above description and/or through practice of the invention. It is therefore intended that the present invention shall extend to all such modifications and variations as may incorporate the broad aspects of the present invention within the full spirit and scope of the invention.

What is claimed is:

1. A channeled under floor heating element comprising:
   a first textile panel and a second textile panel operatively joined together by a plurality of seam structures defining an arrangement of channels extending in a pattern between the first textile panel and the second textile panel;
   an elongate heating element extending through at least a portion of the channels; and
   an elongate sensing element discrete from the elongate heating element extending through at least a portion of the channels, wherein the elongate heating element and the elongate sensing element are arranged in substantially common pattern arrangements such that the portions of the elongate heating element and the elongate sensing element within the channels are disposed in substantially parallel orientation to one another.

2. The channeled under floor heating element of claim 1, wherein at least one of the elongate heating element and the elongate sensing element comprises a metallic wire disposed in wrapped relation to a textile fiber core with an insulating sleeve disposed in surrounding relation to the wrapped wire and fiber core.

3. The channeled under floor heating element of claim 1, wherein each of the elongate heating element and the elongate sensing element comprises a metallic wire disposed in wrapped relation to a textile fiber core with an insulating sleeve disposed in surrounding relation to the wrapped wire and fiber core.

4. The channeled under floor heating element of claim 1, wherein at least one of the elongate heating element and the elongate sensing element comprises a pair of metallic wires disposed in wrapped relation to a textile fiber core with an insulating sleeve disposed in surrounding relation to the wrapped wires and fiber core.

5. The channeled under floor heating element of claim 1, wherein each of the elongate heating element and the elongate sensing element comprises a pair of metallic wires disposed in wrapped relation to a textile fiber core with an insulating sleeve disposed in surrounding relation to the wrapped wires and fiber core.

6. The channeled under floor heating element of claim 1, wherein the elongate heating element and the elongate sensing element extend through common channels.

7. The channeled under floor heating element of claim 6, wherein the elongate heating element and the elongate sensing element are arranged in a common sinusoidal pattern.

8. The under floor heating element of claim 6, wherein the heating element is attached to a carpet substrate.

9. The channeled under floor heating element of claim 1, wherein at least portions of the elongate heating element and the elongate sensing element extend through different channels such that seam structures separate said portions of the elongate heating element and the elongate sensing element from one another.

10. The channeled under floor heating element of claim 9, wherein the elongate heating element and the elongate sensing element are arranged in common sinusoidal patterns shifted out of phase relative to one another.

11. The under floor heating element of claim 9, wherein the heating element is attached to a carpet substrate.

12. The channeled under floor heating element of claim 1, wherein the plurality of seam structures run at least partially along the length of the heating element.

13. The channeled under floor heating element of claim 1, wherein the control element is electrically connected to the each elongate conductive wire structure and at least partially regulates the temperature of the under floor heating element.

14. The channeled under floor heating element of claim 1 further comprising at least one insulating layer.

15. A channeled under floor heating element system comprising at least 2 channeled under floor heating elements of claim 1 electrically connected in a continuous circuit.

16. The channeled under floor heating element of claim 1, further comprising a non-skid layer.

17. The channeled under floor heating element of claim 1, wherein the channeled under floor heating element is encased in foam.

18. The channeled under floor heating element of claim 1, wherein the channeled under floor heating element is attached to a carpet pad.

19. The channeled under floor heating element of claim 1, wherein the elongate heating element and the elongate sensing element are arranged in substantially common wave pattern arrangements such that the portions of the elongate heating element and the elongate sensing element within the channels are disposed in substantially parallel orientation to one another.

20. The under floor heating element of claim 1, wherein the heating element is attached to a carpet substrate.

* * * * *

UNITED STATES PATENT AND TRADEMARK OFFICE
CERTIFICATE OF CORRECTION

| | | |
|---|---|---|
| PATENT NO. | : 7,193,179 B2 | Page 1 of 1 |
| APPLICATION NO. | : 11/328859 | |
| DATED | : March 20, 2007 | |
| INVENTOR(S) | : Horvath et al. | |

It is certified that error appears in the above-identified patent and that said Letters Patent is hereby corrected as shown below:

On title page
Under: Related U.S. Application Data

Delete Item (63) "Continuation-in-part of application No. 11/131,626, filed on May 18, 2005, now Pat. No. 7,038,170."

Please Insert Item (63)
"Continuation-in-part of application No. 11/257,340, filed October 24, 2005, now Pat. No. 7,180,032, which is a continuation-in-part of application No. 11/131,626, filed on May 18, 2005, now Patent No. 7,038,170."

Delete Item (74) "Cherly"

Please insert Item (74) --Cheryl--

Signed and Sealed this

Fifth Day of June, 2007

JON W. DUDAS
*Director of the United States Patent and Trademark Office*